United States Patent [19]

Lemberger et al.

[11] 4,094,814
[45] June 13, 1978

[54] REGENERATION METHOD FOR GRAVITY-FLOWING DEACTIVATED CATALYST PARTICLES

[75] Inventors: Earl S. Lemberger, Buffalo Grove; Robert K. Olson, Elgin; Lester F. Smith, Itasca, all of Ill.

[73] Assignee: UOP Inc., Des Plaines, Ill.

[21] Appl. No.: 806,885

[22] Filed: Jun. 15, 1977

[51] Int. Cl.² ............ B01J 23/96; B01J 21/20; C10G 35/08
[52] U.S. Cl. .................. 252/415; 23/288 B; 23/288 G; 208/140; 252/418
[58] Field of Search ........ 252/415, 418; 208/140; 23/288 B, 288 G

[56] References Cited

U.S. PATENT DOCUMENTS

| | | | |
|---|---|---|---|
| 3,652,231 | 3/1972 | Greenwood et al. | 23/288 G |
| 3,725,249 | 4/1973 | Vesely et al. | 23/288 G |

FOREIGN PATENT DOCUMENTS

| | | | |
|---|---|---|---|
| 2,548,130 | 5/1976 | Germany | 252/415 |

*Primary Examiner*—Winston A. Douglas
*Assistant Examiner*—P. E. Konopka
*Attorney, Agent, or Firm*—James R. Hoatson, Jr.; Robert W. Erickson; William H. Page, II

[57] ABSTRACT

A continuous method for regenerating deactivated catalyst particles in a regeneration zone through which the particles are downwardly movable by way of gravity-flow. Particles are initially introduced into an upper carbon-burning/halogenation zone wherein they are contacted, in a first section, with a first air stream and a first mixture of steam and a halogen, or halogen-containing compound. Partially regenerated/reconditioned particles are then contacted, in a lower second section, with a second air stream and second mixture of steam and halogen. From this two-sectioned, carbon-burning/halogenation zone, the catalyst particles flow via gravity into a drying zone wherein they are contacted by a substantially dry air stream.

8 Claims, 1 Drawing Figure

U.S. Patent
June 13, 1978
4,094,814
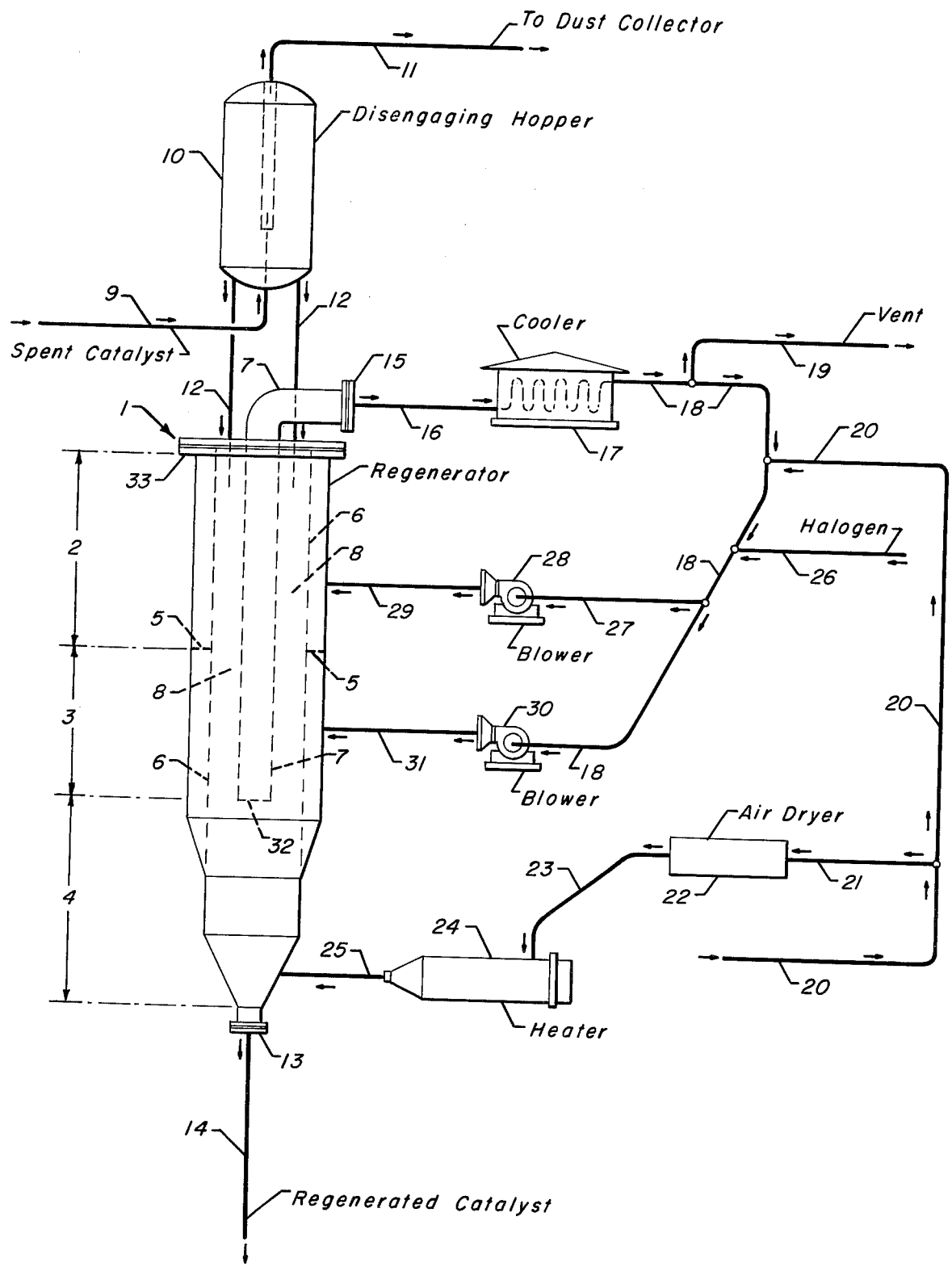

4,094,814

REGENERATION METHOD FOR GRAVITY-FLOWING DEACTIVATED CATALYST PARTICLES

APPLICABILITY OF INVENTION

Movable beds of particulate solids are currently employed in, or are applicable to a wide variety of systems. It is to such systems — i.e. those containing a bed of solids movable therethrough via gravity-flow — that the inventive concept of the present invention is applicable. More specifically, our invention is directed toward a system for the catalytic conversion of hydrocarbonaceous material, in which system deactivated catalyst particles are regenerated in a zone, or chamber through which the particles are downwardly movable via gravityflow.

Relatively recent developments within the petroleum industry have resulted in hydrocarbon conversion processes wherein the reactants contact one or more zones of catalyst particles downwardly movable therethrough via gravity-flow. This operating technique has been proposed for a wide variety of hydrocarbon conversion processes, including catalytic reforming, fixed-bed alkylation, hydrorefining, hydrocracking, dehydrogenation, hydrogenation, steam reforming, etc. Although the present catalyst regeneration technique is applicable to all the foregoing processes, in the interest of brevity the same will be further described in conjunction with the well-known catalytic reforming process.

Historically, the catalytic reforming process utilized a catalytic composite of a Group VIII noble metal component and a halogen component combined with a refractory inorganic oxide, and was effected in a non-regenerative, fixed-bed system consisting of a plurality of reaction zones in side-by-side relation. When the catalytic composite became deactivated to the extent that continued operation was no longer economically feasible, the entire unit was shut down, and the catalyst regenerated in situ. After several such regenerations, the catalyst was replaced with fresh catalyst and the deactivated catalyst subjected either to an exotic reconditioning technique, or an involved method for the recovery of the precious noble metal. Of more recent vintage was the so-called "swing-bed" system in which an extra reactor was substituted for one due to be placed off-stream for regeneration purposes.

Still more recently, a "stacked" reactor system has been provided in which the catalyst particles flow, via gravity, downwardly from one annular-form catalyst zone to another. Ultimately, the catalyst is transferred to a suitable regeneration system also functioning with a downwardly-moving bed of catalyst. In effect, the catalyst particles are maintained within the reaction system, and continuously transferred from one section to another in a manner such that the flow is continuous, at frequent intervals, or at extended intervals, the movement thereof being controlled by the quantity of catalyst withdrawn from the last in the series of individual reaction zones.

It is this type of system — i.e. gravity-flowing catalyst particles — to which our invention is intended to be applied. More particularly, the present regeneration method is directed toward those catalytic composites which have become deactivated as a result of the deposition of carbonaceous matter thereon and the loss of halogen therefrom.

OBJECTS AND EMBODIMENTS

A principal object of our invention is to provide an improved method for continuously regenerating deactivated hydrocarbon conversion catalyst particles. A corollary objective involves a method for regenerating deactivated catalyst particles, comprising a Group VIII noble metal component and a halogen component in conbination with a refractory inorganic oxide, in a regeneration zone through which said catalyst particles are movable via gravity-flow.

Another object of our invention is to afford to more economical technique for regenerating catalyst particles which have been deactivated by deposition of carbonaceous matter thereon and loss of halogen therefrom.

Therefore, in one embodiment, our invention is directed toward a method for continuously regenerating hydrocarbon conversion catalyst particles comprising a Group VIII metal component and a halogen component in combination with a refractory inorganic oxide carrier material, and which have become deactivated (1) by deposition of carbonaceous matter thereon and, (2) through loss of halogen therefrom, in a regeneration zone through which said catalyst particles are downwardly movable via gravity-flow, which regeneration method comprises the inter-related steps of: (a) introducing (i) deactivated catalyst particles, (ii) a first air stream from an external source and, (iii) a first mixture of steam and a halogen, or halogen-containing compound, into a first carbon-burning/ halogenation section; (b) maintaining said catalyst particles within said first section for a time sufficient to (i) remove the greater portion of said carbonaceous matter therefrom and, (ii) increase the halogen content thereof; (c) introducing (i) the catalyst particles from said first section, via gravity-flow, (ii) a second air stream from an external source and, (iii) a second mixture of steam and a halogen, or a halogen-containing compound, into a second carbon-burning/halogenation section; (d) maintaining said catalyst particles within said second section for a time sufficient to (i) remove substantially all of the remaining carbonaceous material therefrom and, (ii) further increase the halogen content thereof; (e) introducing (i) the catalyst particles from said second section, via gravity-flow, and, (ii) a substantially dry third air stream from an external source into a lower drying section, and maintaining said catalyst particles therein for a time sufficient to remove substantially all the water therefrom; and, (f) withdrawing substantially water-free, regenerated catalyst particles from said regeneration zone.

In another embodiment, the temperature in the first and second carbon-burning/halogenation sections is maintained in the range of about 750° to about 1050° F. Generally, the temperature in the lower drying section will be from about 830° to about 1000° F.

Other objects and embodiments of our invention will become evident from the following more detailed description thereof. In one such other embodiment, the excess air and the combustion products resulting from the burning of carbon, are withdrawn from the carbon-burning/halogenation zone, cooled and at least in part recycled to both the first and second carbon-burning sections.

PRIOR ART

U.S. Pat. No. 3,470,090 illustrates a side-by-side reaction system having intermediate heating of the reactant stream. Catalyst withdrawn from an individual reaction zone is transported to suitable regeneration facilities. This particular type of system can be modified such that the catalyst withdrawn from a given reaction zone is sent to the next succeeding reaction zone, while that catalyst withdrawn from the last reaction zone is transported to regeneration facilities. This latter technique is illustrated by U.S. Pat. Nos. 3,647,680 and 3,785,963. The catalytic reforming configuration is shown as a two-stage "stacked" system having an integrated regeneration facility which receives the catalyst particles withdrawn from the bottom reaction chamber. As illustrated, both techniques utilize a downwardly-moving bed of catalyst particles through the stacked reaction zones and through the regeneration chamber.

U.S. Pat. No. 3,652,231 describes a reconditioning, or regeneration system for a moving column of reforming catalyst. It is to this type of regeneration system that our invention is particularly directed, and affords a distinct improvement therein.

A regeneration technique for gravity-flowing catalyst particles is disclosed in U.S. Pat. No. 3,981,824, issued Sept. 21, 1976. Three distinct zones for complete regeneration are employed: (1) a carbon-burning zone, into which the catalyst particles are initially introduced; (2) a halogenation zone; and, (3) a lowermost catalyst-drying zone. Flue gas vapors from the carbon-burning section are at least in part recycled thereto. Likewise, vapors from the drying and halogenation sections are recycled to the halogenation section. Obviously, at least a portion of the effluent vapors from the halogenation section are caused to bypass the recycle conduit and enter the carbon-burning section. A portion of substantially dry air is introduced into a heater and therefrom into the lower drying section. A second portion of the air stream is combined with the recycled flue gas for introduction therewith into the carbon-burning section. Steam and halogen, in admixture with effluent vapors from the drying and halogenation sections, are introduced into a second heater and therefrom into the halogenation section. The main thrust of this described technique involves three-zone regeneration accompanied by split air flow to the drying and carbon-burning sections.

The technique encompassed by our inventive concept differs from the foregoing three-zone regeneration method in several important aspects which lead to significant advantages and/or benefits. Initially, there exists a simplification of the regeneration tower design relative to the internal hardware. Total residence time of the catalyst particles, within the regeneration tower is reduced; thus, changes in regeneration are more quickly observed at the various sample points and especially in the reactor section itself. Start-up procedures become much more simplified; the time required for the start-up procedure is reduced from about 24 hours to about 16 hours, and this greatly lessens the risk of catalyst damage. Simultaneous carbon-burning and halogenation reduces the likelihood of noble metal agglomeration; thus, the metallic components retain their active, dispersed state. When accomplished in two carbon-burning/halogenation sections, the second section serves as a quasi halogen-adjustment section, while simultaneously removing the remaining carbonaceous material. Also, the length of the time required for catalyst regeneration/reconditioning is lessened by approximately one-third; this will afford an increase in total spent catalyst throughput, for a given size regeneration tower, or a corresponding increase in coke-burning capacity.

SUMMARY OF INVENTION

As hereinbefore set forth, our invention is intended to effect the regeneration of deactivated hydrocarbon conversion catalyst particles comprising a Group VIII noble metal component and halogen component combined with a refractory inorganic oxide. In accordance with the Periodic Table of the Elements, E. H. Sargent & Co., 1964, the term "Group VIII noble metal component" is intended to include ruthenium, rhodium, palladium, osmium, iridium, platinum, and mixtures thereof. Furthermore, our regeneration method is applicable to the recently-developed bi-, tri- and tetra-metallic catalysts in which metallic components other than those of the Group VIII noble metals are incorporated therewith. Such other metallic components include technetium, rhenium, gallium, vanadium, cobalt, nickel, gold, germanium, tin, lead, bismuth, etc. Generally, the quantity of the Group VIII noble metal components within the final catalytic composite is small compared to the quantities of the other components combined therewith, and will be present in an amount of about 0.01% to about 2.0% by weight of the final catalytic composite, calculated on an elemental basis. Similarly, with respect to the multi-metallic catalysts, the other metallic components, hereinabove set forth will be present in an amount in the range of about 0.01% to about 5.0%, again calculated on an elemental basis.

Another ingredient of the type of catalytic composites regenerated by the present method is a halogen component. Although the precise form of the chemistry of the association of this component with the other components of the catalyst is not known with accuracy, it is customary in the art to refer thereto as combined halogen. This may be either fluorine, chlorine, iodine, bromine, or mixtures thereof, with fluorine and particularly chlorine being preferred. The halogen component will be present within the catalyst in an amount within the range of about 0.1% to about 5.0%, and generally from about 0.5% to about 1.5% by weight, calculated on an elemental basis. One or more of the foregoing metallic components and the halogen component is combined with a suitable refractory inorganic oxide carrier material. With respect to the latter, many compositions have been employed, including alumina, silica, zirconia, hafnia, boria, thoria, mixtures thereof, etc.; however, with respect to the catalytic reforming of hydrocarbons, alumina in and of itself, is generally preferred.

The foregoing is presented to describe the general type of hydrocarbon conversion catalyst particles to which the regeneration method of the present invention is particularly directed. It is understood that the precise chemical and/or physical make-up of the catalytic composite is not essential to the present invention, nor is the particular technique selected for the manufacture of the catalyst particles. In short, our invention is concerned solely with a method for continuously regenerating deactivated hydrocarbon conversion catalyst particles comprising a Group VIII noble metal component and a halogen component in combination with a refractory inorganic oxide. Further, our method is intended for utilization in those hydrocarbon conversion systems wherein catalyst particles are regenerated in a regeneration zone through which they are movable via gravity-flow.

It is generally conceded, by those possessing the requisite skill in the appropriate art, that the principal cause of observed deactivation or instability of catalytic composites employed in hydrocarbon conversion processes is associated with the formation of coke or carbonaceous matter on the interstitial surface of the catalyst. The conditions utilized in these hydrocarbon conversion processes, to effect the desired reactions, typically result in the formation of black carbonaceous matter (often referred to as coke) which deposits on the surface of the catalyst and gradually reduces its activity by shielding the active sites from the reactants. With many hydrocarbon conversion catalysts, removal of the carbonaceous matter by burning in air, via one or more suitable techniques, generally suffices to reactivate the catalyst to an acceptable degree. However, when considering dual-function catalysts, or those containing a Group VIII noble metal component and a halogen component, carbon removal in and of itself does not result in an acceptable reactivated catalyst. These catalysts, and their capability to function as intended, are acutely sensitive to the loss of the combined halogen both during the processing of the selected hydrocarbon stream and the carbon-burning technique. Therefore, any successful regeneration procedure must recognize the attendant difficulty of restoring a uniform distribution of the halogen component within the catalyst particles. Furthermore, a comparison of fresh catalyst with deactivated catalyst indicates a substantial change in the character of the Group VIII noble metal component associated therewith. Generally, such a comparison indicates that the noble metal component, for example platinum, is no longer thoroughly and uniformly dispersed throughout the catalyst particles, but has been caused to agglomerate. These difficulties become more pronounced in regeneration techniques involving the bi-, tri- and tetra-metallic catalytic composites. As exemplified by U.S. Pat. No. 3,751,379 these problems appear to have been successfully solved with respect to batch reconditioning, or in situ regeneration of a fixed-bed of catalytic particles.

With the advent of continuous hydrocarbon processing, utilizing catalyst particles movable through the various reaction zones via gravity-flow, and having an integrated regeneration facility through which the catalyst particles also flow via gravity, the specter surrounding reconditioning problems is once again in evidence. While it may be that the catalyst particles which the regenerator "sees" initially have a lesser quantity of carbonaceous matter to be removed, and a lesser quantity of halogen to be replaced, the mere fact that the particles are continuously in motion through some part of the regeneration zone necessitates judiciously selected techniques in order to provide a continuous reconditioning method resulting in catalyst particles suitable for re-utilization in the reaction zone, or zones. One technique is that proposed for use with the reconditioning system illustrated in U.S. Pat. No. 3,652,231. The regeneration zone is shown as having an upper carbon-burning section, an intermediate halogenation section and a lower drying section. Catalyst particles are introduced initially into the top of the regeneration zone, pass downwardly through the carbon-burning section into the halogenation section and finally into the lower drying section. All the air required for reconditioning is introduced into the lower drying section and passes upwardly therefrom into the halogenation section, and therethrough into the carbon-burning section. Halogen and steam are introduced into the intermediate halogenation section, and any excess is recycled in admixture with fresh steam and halogen. Furthermore, combustion vapors from the carbon-burning section are introduced into a caustic scrubbing facility, and thereafter recycled to the carbon-burning section. Another three-stage regeneration technique is that set forth in the previously described U.S. Pat. No. 3,981,824; however, the aspect of split air flow is incorporated therein.

Our catalyst regeneration technique is intended to improve significantly both of the above-described techniques. To reiterate briefly, the regeneration technique is accomplished in two discreet zones, as contrasted to the three zones of the prior art. In accordance with our inventive concept, substantially dry air is introduced to the lower drying zone and undried air to the upper carbon-burning/halogenation zone. With respect to the latter, the air is admixed with the steam/halogen mixture and recycled flue gas, and introduced therewith into this dual-function zone. The combined carbon-burning/halogenation zone is divided into two sections, into both of which the mixture of flue gas, steam, halogen and air is introduced. The mole ratio of air introduced into both carbon-burning sections, to that introduced into the drying zone is at least 1.0:1.0, and generally in the range of about 1.0:1.0 to about 9.0:1.0. Preferably, the quantity (or proportion) of air introduced into the drying zones will be the minimum sufficient to accomplish the necessary drying. Furthermore, the flue gas from the carbon-burning/halogenation sections is recycled thereto without any intermediate treatment, excepting the cooling thereof. The relative rates of the dry air and flue gas recycle are maintained to control the oxygen concentration at a level in the range of about 0.2% to 2.0%, on a model basis, and preferably from about 0.5% to about 1.5%.

The upper section of the regeneration tower essentially serves two principal functions; first, the coke and/or carbonaceous material must be removed from the catalyst particles and, secondly, the halogen content must be increased while simultaneously properly dispersing the metallic components. One consequence of split air flow — i.e. introducing from about 10.0% to about 50.0% of the required air into the lower drying zone — is to maintain the necessary partial pressure of halogen in the upper combined carbon-burning-/halogenation zone with less overall fresh halogen addition. Furthermore, combining the halogenation and carbon-burning functions alleviates noble metal agglomeration normally occurring when the carbonaceous material is removed from the catalyst particles. Assuming a fresh catalyst halogen content of about 1.0% by weight (as combined halide), which is reduced to a level of about 0.75% when the catalyst is deactivated, the concentration will be about 1.1% by weight following halogenation and carbon burning, and about 1.0% by weight following the drying step.

In further describing our invention, reference will be made to the accompanying diagrammatic sketch. This is presented for the sole purpose of illustration, and not with the intent of limiting our invention beyond the scope and spirit of the appended claims. Miscellaneous appurtenances, not required for a clear understanding, have been eliminated.

DESCRIPTION OF DRAWING

With specific reference now to the drawing, there is illustrated a regenerating tower 1, having an upper, first carbon-burning/halogenation section 2, a lower, second carbon-burning/halogenation section 3 and a lower drying zone 4. Although the various structural elements may take any suitable tubular form, sound engineering principles and techniques dictate that the same be substantially circular in cross-section. Catalyst particles which have been withdrawn from the lower terminus of a reaction zone, through which they are movable via gravity-flow, are transported to regenerating tower 1 by way of lift line 9 and are introduced thereby into disengaging hopper 10. Catalyst particles are disengaged from dustlike catalyst fines which are removed from the regeneration facility by way of conduit 11, and transported thereby to a dust collector. Separated catalyst particles flow downwardly through a plurality of inlet conduits 12, generally numbering from about four to 16, and into annular-form space 8. The latter is formed by a perforated centerpipe 7 and an outer catalyst-retaining screen 6, through which the reconditioning vapors pass.

The catalyst particles, at a temperature of about 210° F., initially traverse carbon-burning/halogenation section 2 which functions in the temperature range of about 830° F. (443° C.) to about 990° F. (532° C.). Catalyst-burning/halogenation section 2 is that portion of the regenerating tower which extends from the top plate to a horizontally-disposed baffle 5. The second carbon-burning/halogenation section 3, also functioning at about 830° F. (443° C.) to about 990° F. (532° C.), is that portion of regeneration tower 1 below horizontal baffle 5 and the terminal end of perforated centerpipe 7. Substantially carbon-free catalyst particles flow via gravity into lower drying zone 4 which is maintained at an elevated temperature of about 830° F. (443° C.) to about 1000° F. (538° C.); that is, substantially dry air, introduced into the frusto-conical section by way of line 25, is at a temperature of about 1000° F. (538° C.), while catalyst particles emanating from the regenerating tower, via outlet port 13 and line 14, are at a temperature of about 830° F. (443° C.). Dried, reconditioned catalyst particles are subjected to hydrogen reduction either in a separate vessel prior to being transported to the reaction zone, or in a vessel which is an integral part of the reaction zone.

At least a portion of the effluent vapors, flue gas, emanating from the carbon-burning/halogenation sections of the regeneration tower 1, are recycled thereto. Through this technique, the oxygen concentration within this upper zone is regulated and maintained in the preferred range of about 0.5% to about 1.5%. Furthermore, dilution of the halogen-steam atmosphere within the carbon-burning/halogenation sections is effected by the vapors emanating from the drying section. This relatively severe oxidizing atmosphere facilitates the redistribution of the noble metal component.

The remainder of the drawing will be described in conjunction with a commercially-scaled regeneration designed to process about 500 lbs/hr. (227 kg/hr.) of deactivated catalyst particles containing about 0.75% by weight of combined chloride and about 5.2% by weight of carbonaceous matter (coke). About 11.55 moles/hr. of air, from a suitable external source, are introduced by way of line 20. Approximately 50.0% is diverted through line 21 into dryer 22, through line 23 and an electric heater 24. The temperature thereof is increased to about 1000° F. (538° C.), and the heated air is introduced into drying zone 4 via line 25. About 0.24 moles/hr. of water are removed from the catalyst particles in the drying zone.

A mixture of steam and halogen, or a halogen-containing compound is introduced by way of line 26, admixed with recycled flue gas from line 18, and the remaining portion of substantially air from line 20. Approximately ⅛ to ⅜ of the resulting mixture is diverted through line 27 and blower 28 into conduit 29, through which it is introduced into upper carbon-burning-/halogenation section 2. This halogen-containing stream is at a temperature of about 830° F. (443° C.). The halogen, for example chlorine, may be employed in its elemental state, or as a compound such as hydrogen chloride, ethylene dichloride, propylene dichloride, tertiary butyl chloride, etc. The remaining portion of flue gas, steam, halogen and air mixture continues through conduit 18 and blower 30 into line 31, through which it is introduced into the second carbon-burning-/halogenation section 3. In the present illustration, halogen addition takes the form of a steam/hydrogen chloride mixture entering by way of conduit 26; of the 0.44 moles/hr., about 0.13 moles is hydrogen chloride.

Effluent vapors from upper carbon-burning-/halogenation section 2, at a temperature of about 930° F. (498° C.), are withdrawn through the extension of centerpipe 7 and outlet port 15; these are introduced, by way of line 16, into cooler 17, wherein the temperature is decreased to about 840° F. (449° C.). Thus cooled vapors are withdrawn via line 18, and about 400 moles/hr. continue therethrough. The remaining portion of the cooled flue gas vapors are vented from the system through conduit 19.

The catalyst particles introduced into the regeneration zone from disengaging hopper 10, contain about 26.1 lbs/hr. (11.8 kg/hr.) of coke and about 0.75% by weight of combined chloride. When these leave the carbon-burning/halogenation sections, they are substantially coke-free; the halogen content has been increased to about 1.1% by weight, and the catalyst particles contain about 0.90% by weight of water. The latter is removed in the drying zone, and the dried catalyst particles are withdrawn from the regeneration zone containing 1.0% by weight of halogen. The upper carbon-burning/halogenation sections and the lower drying zone, of the regeneration zone 1, are sized and designed to provide an effective residence time, of the catalyst particles passing through each section, of from 1 to about 3 hours.

The foregoing illustrates the regeneration technique of the present invention wherein the regenerating tower consists of two stages as contrasted to the three-stage technique of the prior art. As a principal result, there is afforded an approximate two- to three-fold increase in coke-burning capacity. Other benefits and advantages will become apparent to those possessing the requisite skill in the appropriate art.

We claim as our invention:

1. A method for continuously regenerating hydrocarbon conversion catalyst particles comprising a Group VIII metal and a halogen component in combination with a refractory inorganic oxide carrier material, and which have become deactivated (1) by deposition of carbonaceous matter thereon and, (2) through loss of halogen therefrom, in a regeneration zone comprising a first carbon-burning/halogenation section interconnected with and surmounted with respect to a second carbon-burning/halogenation section, said second being interconnected with and surmounted with respect to a lower drying section, wherein said catalyst particles are downwardly and countercurrently movable through a descending column via gravity-flow with respect to the upward flow of vapors within said regeneration zone, said regeneration method comprising the inter-related sequential steps of:

(a) introducing (i) said deactivated catalyst particles, (ii) a first air stream from an external source and, (iii) a first mixture of steam and a halogen, or halogen-containing compound from an external source, into said first carbon-burning/halogenation section;

(b) maintaining said catalyst particles within said first section for a time sufficient to (i) remove the greater portion of said carbonaceous matter therefrom and, (ii) increase the halogen content thereof;

(c) introducing (i) said catalyst particles from said first section, via gravity-flow and (ii) a second air stream from an external source and, (iii) a second mixture of steam and a halogen, or a halogen-containing compound from an external source, into said second section;

(d) maintaining said catalyst particles within said second section for a time sufficient to (i) remove substantially all of the remaining carbonaceous material therefrom and, (ii) further increase the halogen content thereof;

(e) introducing (i) said catalyst particles from said second section, via gravity-flow and countercurrent with, (ii) a substantially dry third air stream from an external source into said lower drying section, and maintaining said catalyst particles therein for a time sufficient to remove substantially all the water therefrom; and, (f) withdrawing substantially water-free, regenerated catalyst particles from said regeneration zone.

2. The method of claim 1 further characterized in that said first and second carbon-burning/halogenation sections are maintained at a temperature in the range of about 750° to about 1050° F.

3. The method of claim 1 further characterized in that said lower drying section is maintained at a temperature of about 830° to about 1000° F.

4. The method of claim 1 further characterized in that said first air stream is introduced into said first carbon-burning/halogenation section through the same locus through which said first steam/halogen mixture is introduced.

5. The method of claim 1 further characterized in that said second air stream is introduced into said second carbon-burning/halogenation section through the same locus through which said second steam/halogen mixture is introduced.

6. The method of claim 1 further characterized in that the mole ratio of the air in said first and second streams to the air in said third stream is at least 1.0:1.0.

7. The method of claim 1 further characterized in that excess air and the combustion products resulting from the burning of carbon, are withdrawn from said first carbon-burning section, cooled and at least in part recycled to said first and second carbon-burning sections.

8. The method of claim 7 further characterized in that said excess air and combustion products are recycled to said carbon-burning/halogenation sections without intermediate treatment.

* * * * *